(12) United States Patent
Kwan et al.

(10) Patent No.: US 7,859,996 B2
(45) Date of Patent: Dec. 28, 2010

(54) INTELLIGENT CONGESTION FEEDBACK APPARATUS AND METHOD

(75) Inventors: Bruce H. Kwan, Sunnyvale, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 1355 days.

(21) Appl. No.: 11/259,095

(22) Filed: Oct. 27, 2005

(65) Prior Publication Data

US 2006/0092836 A1    May 4, 2006

Related U.S. Application Data

(60) Provisional application No. 60/679,242, filed on May 10, 2005, provisional application No. 60/622,792, filed on Oct. 29, 2004.

(51) Int. Cl.
*H04J 1/16* (2006.01)

(52) U.S. Cl. .......................... 370/229; 370/235

(58) Field of Classification Search ................... 370/94, 370/218, 412, 229, 236, 352, 60, 397, 230, 370/395.1; 709/235, 238
See application file for complete search history.

(56) References Cited

U.S. PATENT DOCUMENTS

| | | | | | |
|---|---|---|---|---|---|
| 5,042,029 | A | * | 8/1991 | Hayakawa | 370/231 |
| 5,426,640 | A | * | 6/1995 | Hluchyj et al. | 370/235 |
| 5,917,823 | A | * | 6/1999 | Benning et al. | 370/397 |
| 6,333,917 | B1 | * | 12/2001 | Lyon et al. | 370/236 |
| 6,614,755 | B1 | * | 9/2003 | Dote | 370/230 |
| 7,369,498 | B1 | * | 5/2008 | Ma et al. | 370/235 |
| 2003/0097461 | A1 | * | 5/2003 | Barham et al. | 709/235 |
| 2004/0037223 | A1 | * | 2/2004 | Harrison et al. | 370/235 |
| 2004/0196785 | A1 | * | 10/2004 | Janakiraman et al. | 370/229 |
| 2005/0021842 | A1 | * | 1/2005 | Narayanan et al. | 709/238 |
| 2005/0052994 | A1 | * | 3/2005 | Lee | 370/230 |
| 2005/0157641 | A1 | * | 7/2005 | Roy | 370/218 |

* cited by examiner

*Primary Examiner*—Steven H Nguyen
*Assistant Examiner*—Syed Bokhari

(57) ABSTRACT

An intelligent congestion feedback apparatus and method thereof includes a source endpoint transmitting data packets, and a destination endpoint receiving the data packets, and a timer in the destination endpoint set to zero. An intermediate node detects congestion between the source endpoint and the destination endpoint. Upon congestion detection, the intermediate node marks the data packets transmitted to the destination endpoint indicative of congestion. Upon receipt of the marked data packets, the timer begins reverse counting from a preset time value to zero and a feedback loop is turned-on between the destination endpoint and the source endpoint to transmit congestion notification (CN) messages to the source endpoint contributing to the congestion.

24 Claims, 6 Drawing Sheets

INTELLIGENT CONGESTION FEEDBACK APPARATUS AND METHOD

REFERENCE TO RELATED APPLICATIONS

This application claims priority of U.S. Provisional Patent Application Ser. No. 60/622,792, filed Oct. 29, 2004 and U.S. Provisional Patent Application Ser. No. 60/279,242, filed May 10, 2005. The subject matter of these earlier filed application are hereby incorporated by reference.

BACKGROUND OF THE INVENTION

1. Field of the Invention

The present invention relates to a method and apparatus for providing intelligent congestion feedback during a preset time period. More specifically, an apparatus and a method include a timer per destination endpoint timing a preset time period during which a feedback loop is turned-on upon detection of congestion.

2. Description of the Related Art

Network congestion generally refers to overloading the resources of a network, such as routers and switches, with packets that need to be handled. When network congestion occurs, packets are dropped by an overloaded resource and have to be retransmitted. Numerous methods and proposals for avoiding network congestion are known, but each has its own drawbacks with respect to issues such as fairness, (e.g., which packets get dropped), enforcement, practical implementation difficulties, and so forth.

For example, in the Transmission Control Protocol (TCP), network congestion is controlled via various phases and techniques, including a congestion avoidance phase. TCP controls a transmit rate by a congestion window that determines the maximum amount of data that may be in transit at any time, wherein a congestion window's worth of data is transmitted every round-trip time. In the absence of congestion, TCP increases its congestion window by one packet each round-trip time. To avoid congestion, if the network drops any packets, TCP halves its congestion window. However, detecting congestion through packet loss, typically as a result of overflow in a router's output queue, has a number of drawbacks including that this method is reactive rather than proactive, as by the time the (often substantial) router buffers are filled up and packets start to get dropped, the network is seriously overloaded. Consequently, the "normal" operating state of the network is to have substantial queuing delays in each router during periods of congestion. Moreover, only those flows whose packets are dropped are aware of the congestion, which is why TCP needs to back off aggressively and halve the congestion window. The dropped packets are not necessarily from the source that initially caused the congestion.

A proposed improvement to TCP/IP, known as Explicit Congestion Notification (ECN), would mark the packets instead of actually dropping them. The mark is returned to the source, whereby the source may slow down its rate of transmission. However, to implement an ECN scheme, significant complexity is added at the TCP level to ensure that at least one congestion mark on a packet in a round-trip time's worth of packets has the same effect as a packet loss on the congestion window. ECN has a number of drawbacks including that complexity is added throughout the network, ECN only works with modified TCP code, and ECN is particularly difficult to enforce, e.g., an uncooperative source can simply ignore the notification to get more than its fair share of network resources.

When supporting ECN, typically a feedback loop between source and destination endpoints is piggybacked on TCP ACK packets traveling in an opposite direction back to the source endpoint. This steady feedback of network state information is crucial for the responsiveness of a control loop.

Also, when supporting ECN, the destination endpoint continuously sends, via a feedback loop, ACK packets back to the source endpoint to acknowledge receipt of the data packets transmitted. That is, the ACK packets are used for reliable data transfer. In the network, the ACK packet is associated with every packet as a constant feedback. However, the ACK packets do consume a significant amount of bandwidth.

Accordingly, an apparatus and method are needed for systems that do not make use of TCP that would enable congestion detection without requiring that a stream of ACK packets be sent end to end across the network at all times, that is from the destination to the source endpoints. Accordingly, an apparatus and method are needed that would provide a predictable and configurable stream of feedback information to the source endpoints so that the feedback loop is responsive and so that the network converges to a good operating point quickly.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. The embodiments of the present invention described below provide an approach of an explicit congestion notification for networking applications to resolve network congestion in a packet-switched network, without requiring that traffic delivery be end-to-end reliable across a network. According to an embodiment of the present invention, a set of timers are associated per destination endpoint to measure, upon detection of a congestion occurrence, a period of time or time window to trigger or "wake-up" a feedback loop between a destination endpoint and each source endpoint contributing to the congestion. Within this set of timers at the destination endpoint, there may exist one per source endpoint and per COS queue. During the time window, congestion notification messages are sent from the destination endpoint to each source endpoint contributing to the congestion at the destination endpoint.

Figure 1:
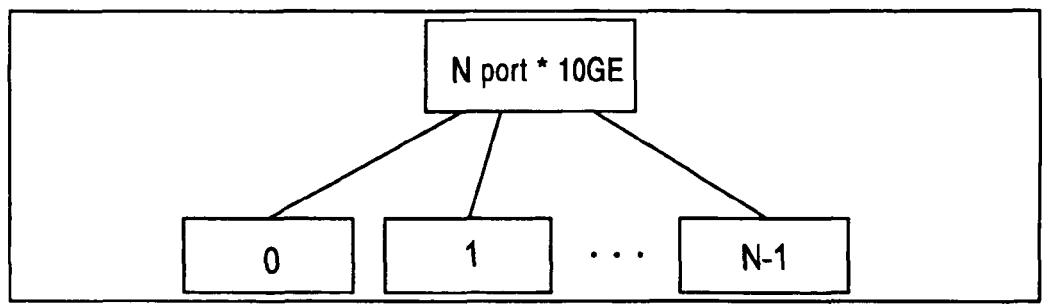
FIG. 1 illustrates a single stage switch fabric configuration device, in accordance with an embodiment of the present invention.
Figure 2:
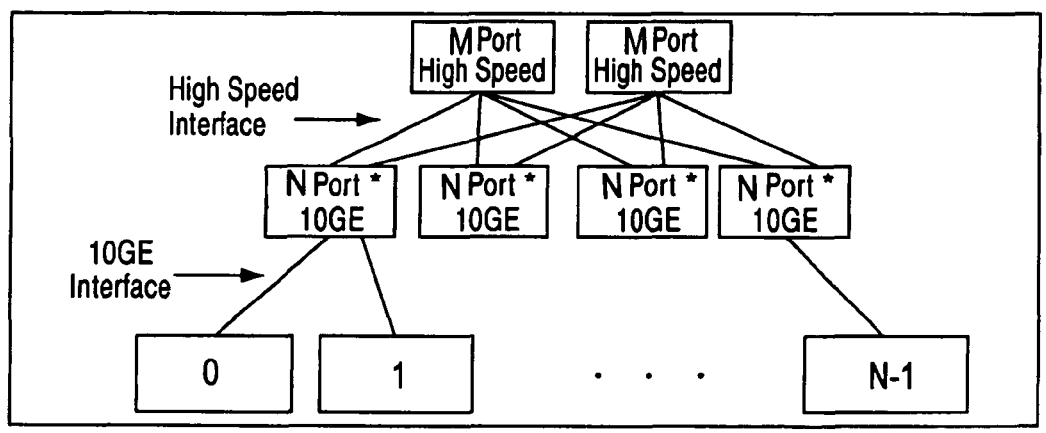
FIG. 2 illustrates a multi-stage switch fabric configuration device, in accordance with an embodiment of the present invention.

In accordance with an embodiment of the present invention, FIG. 1 illustrates a single-stage intelligent congestion feedback (ICF) switch device as a high density 10 Gigabit Ethernet (GE) switching device. In FIG. 1, a set of N endpoints may be connected to the single stage ICF switch device. In an alternative embodiment of the present invention, the single-stage ICF switch device may be used as a part of a multi-stage ICF switch device as shown in FIG. 2. In the configuration of FIG. 2, a multiple-stage ICF switch device is configured to be an N port device including some number of 10 GE ports facing the endpoints and some number of fabric facing ports facing towards the second stage of the fabric.

The single-stage ICF switch device and the multiple-stage ICF switch device aim to achieve intelligent fabric congestion control (IFCC), which is a mechanism used to combat congestion. Congestion may occur within the fabric due to oversubscription of a fabric egress port. The ICF apparatus and method makes use of packet marking within the fabric (i.e., Forward Explicit Congestion Notification or FECN) and source endpoint rate control. FECN is useful for combating persistent congestion such as when multiple source endpoints are sending to the same destination endpoint. Congestion control is the mechanism that is used to establish an optimal operating region during these congestion scenarios.

Figure 3:
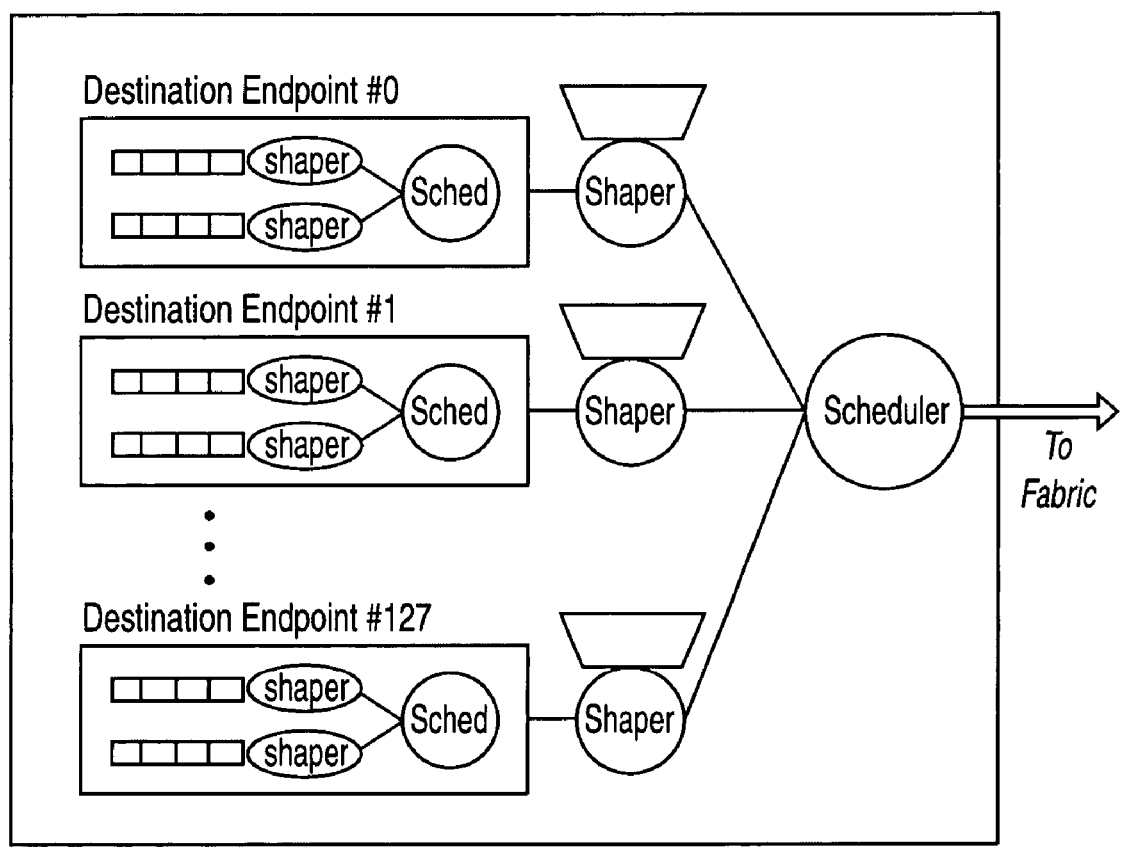
FIG. 3 illustrates an egress port link scheduler, in accordance with an embodiment of the present invention.

To support the intelligent congestion feedback, as shown in FIG. 3, a scheduler must be able to provide the required rate control per destination endpoint and Class of Service granularity. Consequently, as shown in FIG. 3, traffic shaping is supported per destination endpoint and Class of Service basis (COS) which is used to influence the scheduler to cease servicing specific destination endpoint COS queues.

In any reliable transport protocol, such as a Transmission Control Protocol (TCP), Hypertext Transport Protocol (HTTP), Real time Transport Protocol (RTP), or Real time Transport Control Protocol (RTCP), multiple hubs may exist between a source and a destination. In such reliable transport protocols, a packet sent from the source endpoint to the destination endpoint generates an acknowledge (ACK) packet at the destination endpoint indicating that the packet was received.

Figure 4:
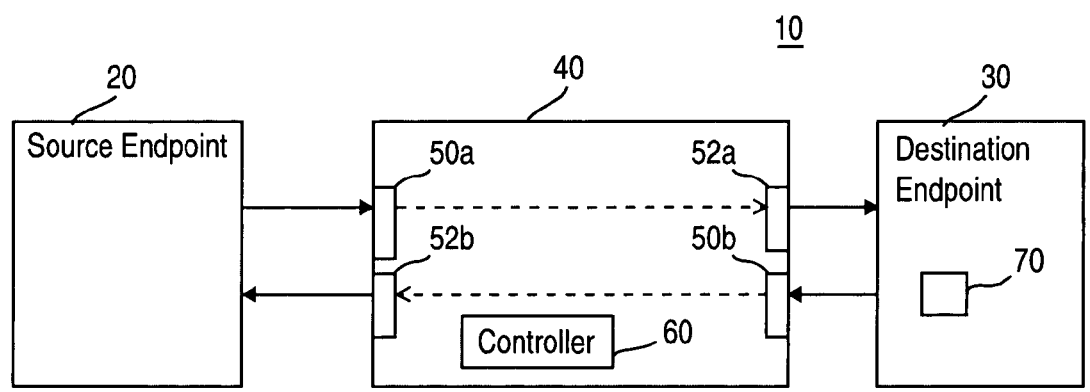
FIG. 4 illustrates a configuration of an intelligent congestion feedback apparatus, in accordance with an embodiment of the present invention.

FIG. 4 illustrates a simple packet-switched network 10 having an example of an Intelligent Congestion Feedback (ICF) apparatus for detecting and resolving congestion in the switch network 10. The switch network 10 may be a single stage or multi-stage switch fabric configuration. The packet-switched network 10 includes, for example, a source endpoint 20, a destination endpoint 30, and an intermediate node 40. IP bandwidth-limited links may be utilized to connect the source endpoint 20 and the destination endpoint 30 to the intermediate node 40. The IP bandwidth-limited links may represent a low bandwidth link such as, for example, an integrated service digital service (ISDN) link and a modem link that connect to the source endpoint 20 and the destination endpoint 30. Alternatively, the bandwidth-limited links may include a TCP/IP network of an Internet Service Provider (ISP), the Internet and different source and destination networks, including, for example, a packet- switched network that provides linkage between the source endpoint 20 and the destination endpoint 30.

The source endpoint 20 and the destination endpoint 30 are known as end systems which may correspond to PCs, workstations, mainframes, file servers, storage devices and other types of computers. The intermediate node 40 may correspond to a router or a communication gateway containing a number of communication links for forwarding data arriving over one link onto another link for transmission to an end system or another router.

The source endpoint 20 generates the data packets, which are forwarded to the destination endpoint 30. The source endpoint 20 may transform the data packets into IP packets before transmitting the packets to the intermediate node 40. The rate of the data packets are controlled and managed by the source endpoint 20 to avoid congestion and to limit bandwidth usage of the data packets in the switch network 10. The intermediate node 40 receives the incoming data packets and forwards the same to the destination endpoint 30 according to the information contained in a header of each data packet. In addition, the intermediate node 40 detects the congestion and marks the header of each data packet being transmitted to the destination endpoint 30.

Included in the intermediate node 40 is an Explicit Congestion Notification (ECN) controller 60 used to detect the congestion and to trigger the intermediate node 40 to detect congestion and to mark the header of the data packet, to be later described. Generally, the ECN controller 60 of the intermediate node 40 monitors an average queue size of incoming data packets from the source endpoint 20 for explicit congestion notification. When the average queue size of incoming data packets exceeds a designated threshold defined, the ECN controller 60 triggers the intermediate node 40 to set a mark in the header of the data packet to notify the destination endpoint 30 of the congestion.

For instance, the intermediate node 40 sets or marks an ECN bit tag in a header of the data packet to indicate congestion to the destination endpoint 30. For non-IP traffic, the marking may be done in a proprietary header field. The egress queue 52a would output the marked data packet (ECN packet—a packet that has the ECN bit set) to the destination endpoint 30. The header would contain control information such as format identifiers, which indicate what portion of a message is contained in the data packet, a source address indicative of the source endpoint 20 sending the data packet, a destination address indicative of the intended destination endpoint 30 of the data packet, and the ECN bit tag. In addition, if the data packet to be marked is an Ethernet frame, the marking may occur by setting a CFI bit found in a VLAN tagged Ethernet frame. If the data packet is an IP packet, then the marking occurs in the ECN bits but if it is a non-IP frame, then a bit in the proprietary header is marked to indicate that congestion was experienced along the path from the source endpoint to the destination endpoint. The intermediate node 40 then outputs each marked data packet to the destination endpoint 30.

When supporting ECN, conventionally, a TCP destination endpoint would continuously send, via a feedback loop, acknowledgment (ACK) packets back to a source endpoint to acknowledge receipt of the data packets transmitted. That is, the ACK packets are used to support TCP's reliable data transfer. In a conventional switch network which is handling TCP traffic, the ACK packet is associated with every packet as a constant feedback. However, the ACK packets do consume a significant amount of bandwidth. Thus, in accordance with an embodiment of the present invention, the switch network 10, in which TCP may not be used as the transport layer, is set up so that a feedback loop (e.g., from the destination endpoint to the source endpoint) is turned-on only when congestion is detected and only for a preset time period. It is not necessary to send the ACK packets to the source endpoint 20 at all times, when congestion is not occurring. Although the feedback loop is illustrated in FIG. 4 to be between the source endpoint to the destination endpoint, a person of ordinary skill in the art will appreciate that the feedback loop from the destination endpoint 30 to the source endpoint 20 may be outside the intermediate node 40 or may be defined by other types of feedback loop means well known in the art.

Accordingly, upon detecting congestion, after marking the header of the data packet with the ECN bit tag indicative of a congestion occurrence and receipt of the marked data packet at the destination endpoint 30, the timer 70 corresponding to the particular source endpoint 20 contributing to the congestion is triggered to begin reverse counting from a preset time value down to zero. The source endpoint 20 contributing to the congestion may be identified from the marked header information of the data packet through a source address (SA). The preset time value may be determined during system initialization, for instance. In an alternative, the destination endpoint 30 may dynamically, that is, automatically or without human intervention, adjust the preset time period depending upon the number of source endpoints contributing to the congestion, and/or depending upon a degree of congestion.

The preset time value may also define the period of time that the destination endpoint 30 would maintain the feedback loop turned-on for transmitting the ACK packets with the ECN bit tag active (i.e., for transmitting the CN messages) back to the source endpoint 20. Thus, when the destination endpoint 30 receives the marked header of the data packet from the source endpoint 20, the timer 70 associated with the particular source endpoint 20 is set to the preset time value and begins reverse timing. During reverse timing, if another marked header of another data packet is received, the timer 70 would be reset back to the preset time value and would then continue to count down.

The destination endpoint 30 may keep congestion state on a per source endpoint 20 and per COS. The state includes two components:

1. Congestion State: A flag that specifies whether or not a particular source endpoint 20 and COS is currently identified as a congestion contributor to the destination endpoint 30.

2. Decision State: This is a statistical measure of the received packets on a per source endpoint 20 and COS basis that is used to determine whether or not a source endpoint 20 is a congestion contributor or not.

During the time period that the timer 70 is reverse timing, a feedback loop between the destination endpoint 30 and the particular source endpoint 20 contributing to the congestion is turned-on or "woken-up" by the marked data packets, thereby notifying the source endpoint 20 of a congestion state.

The feedback loop may deliver the congestion notification in a backward data packet to the source endpoint 20. Alternatively, the destination endpoint 30 may send the CN message to notify each identified source endpoint 20 that is contributing to the congestion of the particular egress queue 52a. The CN message minimally specifies the destination endpoint 30 reporting the message and whether or not a path leading to the destination endpoint 30 is congested. The CN message may also specify the COS that should be affected by the message. Since it is assumed that TCP is not being used, the congestion mechanism may use CN messages that may include the following fields: SrcEndpointAddress, DestEndpointAddress, and CongestionState.

Upon receipt of the CN message, the identified source endpoint 20 may either interrupt or pause further transmission of the data packets or reduce a rate of transmission of the data packets to be enqueued to the egress queue 52a experiencing congestion. For instance, using conventional Additive Increase Multiplicative Decrease (AIMD) style congestion avoidance algorithms, the source endpoint 20 would reduce its sending speed to resolve the congestion in the switch 10. The interruption or pause to the identified source endpoint 20 would pause one COS of the data packets without interrupting or pausing other data packets.

Thus, as shown in FIG. 4, so long as the timer 70 has a time value greater than zero, the destination endpoint 30 will continue to send the CN messages to the source endpoint 20 through the feedback loop. If during the preset time period, the intermediate node 40 determines that the congestion has been resolved, then the intermediate node 40 would stop marking the data packets with the ECN bit tag. Upon receipt of unmarked data packets, the destination endpoint 30 continues to transmit CN messages to the source endpoint 20 until the timer 70 reaches zero.

If the timer 70 reaches zero, the destination endpoint 30 ends the feedback loop. Also, while the timer 70 is counting down from the preset time value to zero, if the destination endpoint 30 receives another marked data packet from the source endpoint 20 indicative of congestion, the timer is reset back to the preset time value and resumes count down.

Accordingly, the ICF apparatus provides a predictable and configurable stream of feedback information only when needed (i.e., during congestion events) to the relevant source endpoints 20 so that the congestion feedback loop is responsive and so that the switch 10 converges to a good operating point quickly.

Figure 5:
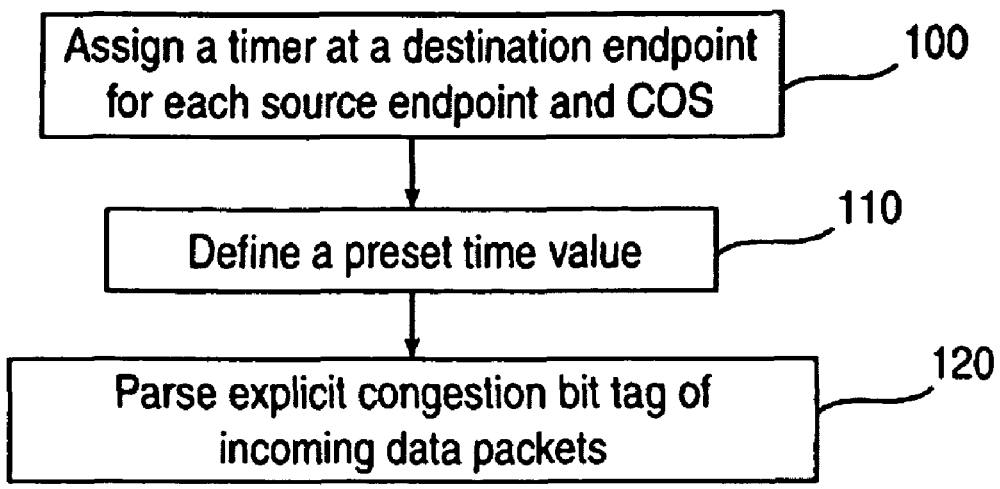
FIG. 5 illustrates a set-up method, in accordance with an embodiment of the present invention.

FIG. 5 illustrates a set-up method performed, in accordance with an embodiment of the present invention. At operation 100, the method assigns the timer 70 at the destination endpoint 30 for each source endpoint 20 on a per COS basis. At operation 110, the method defines the preset time value from which the timer 70 will be decrementing to zero. At operation 120, the method parses the ECN bit tags of incoming data packets using the controller 60.

Figure 6:
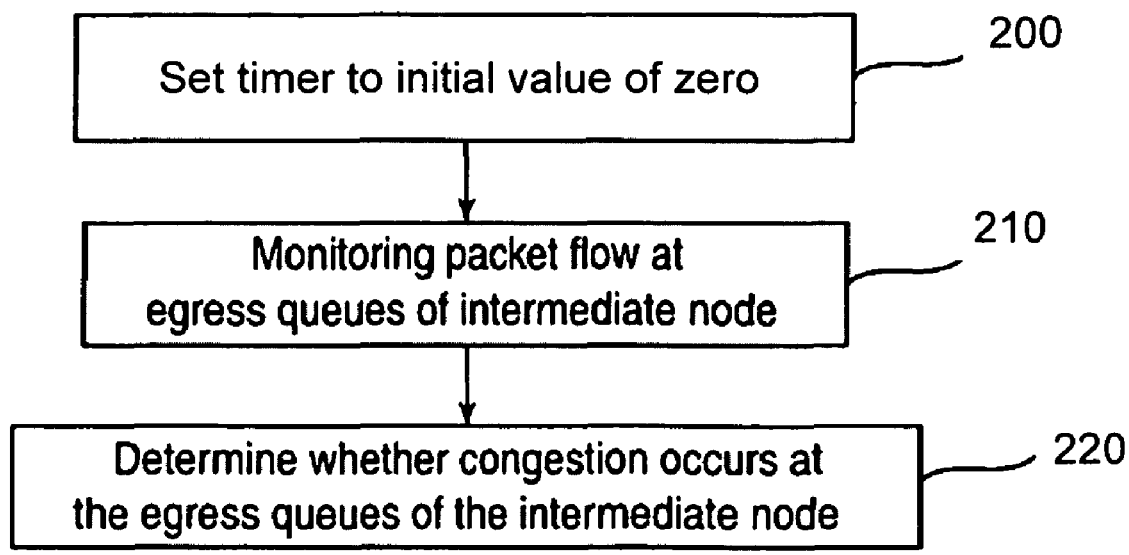
FIG. 6 illustrates a method performed during normal operation, in accordance with an embodiment of the present invention.

FIG. 6 illustrates a method performed by the controller 60 during normal operation of enqueuing and dequeuing of the data packets, in accordance with an embodiment of the present invention. At operation 200, the destination endpoint sets the the timers 70 to an initial value of 0. At operation 210, the method monitors the data packet flow at the egress queues 52a of the intermediate node 40. At operation 220, the method determines whether congestion occurs at the egress queues 52a of the intermediate node 40. Because the data packets generated by the source endpoint 20 are transmitted to the destination endpoint 30 with no significant delay, the intermediate node 40 does not detect congestion and the controller 60 does not trigger the intermediate node 40 to mark the data packets being dequeued from the egress queue 52a. Accordingly, the destination endpoint 30 does not turn-on or "wake-up" the feedback loop to the source endpoint 20. The destination endpoint 30 does not send CN messages to the source endpoint 20.

Figure 7A:
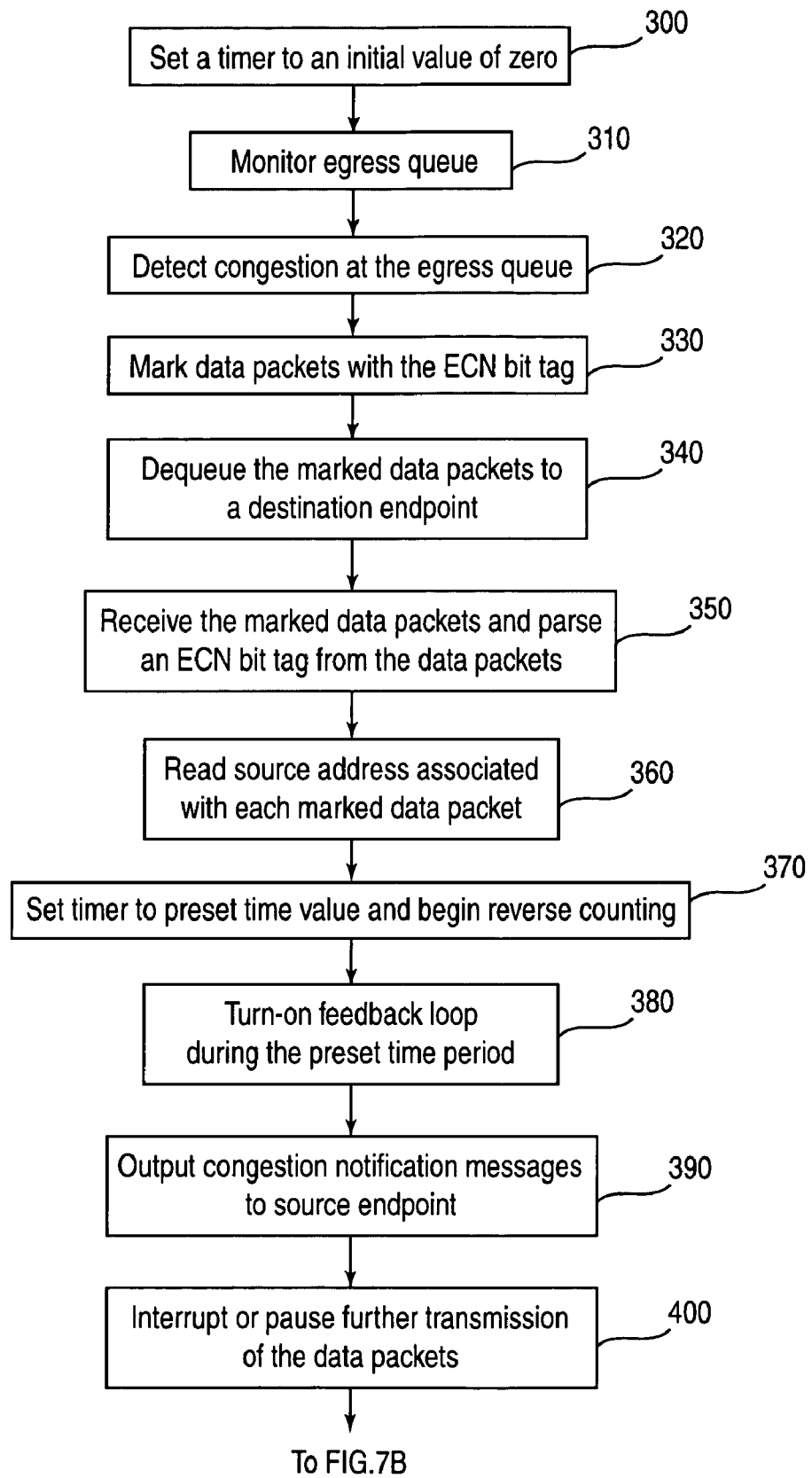
FIGS. 7A and 7B illustrate an intelligent congestion feedback method, in accordance with an embodiment of the present invention.
Figure 7B:
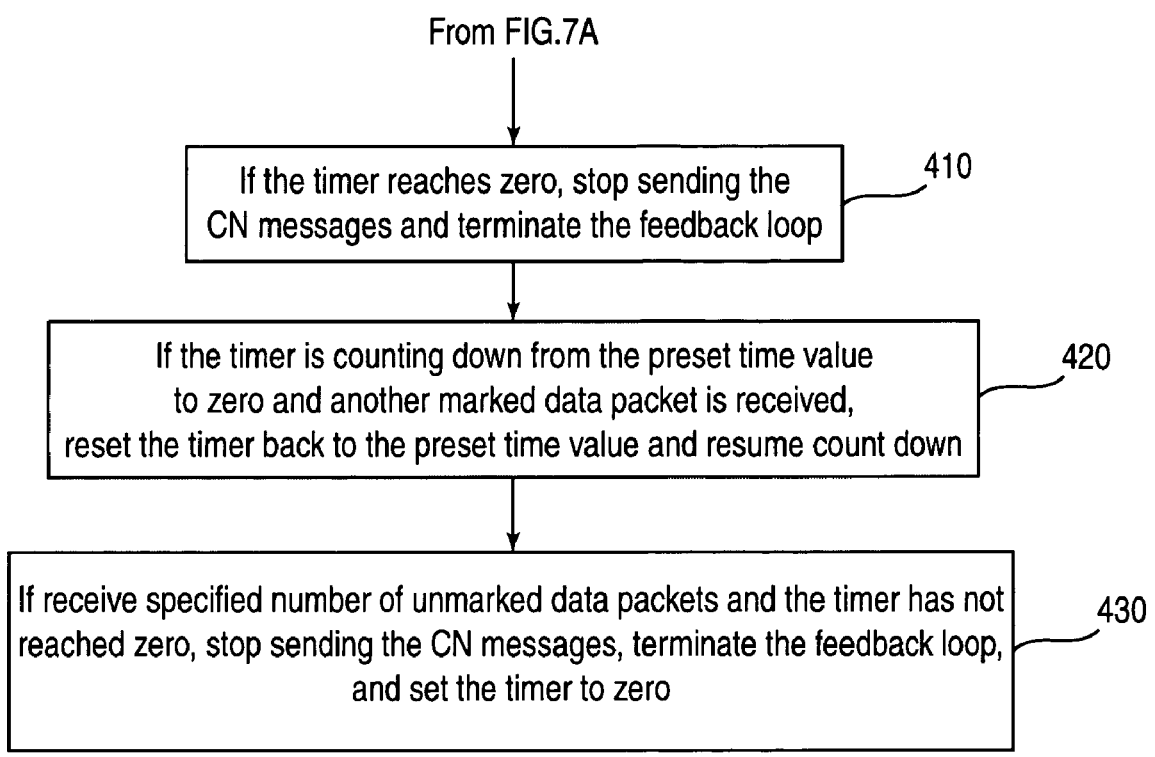

FIGS. 7A and 7B illustrate the ICF method performed to detect congestion, in accordance with an embodiment of the present invention. At operation 300, the method sets the timer 70 at the destination endpoint 30 to an initial value of zero. At operation 310, the method monitors the egress queue 52a of the intermediate node 40 to determine whether the data packets are being dequeued to the destination endpoint 30 without a significant delay. At operation 320, the method detects congestion at the egress queue 52a. At operation 330, the method begins to mark the data packets with the ECN bit tag, and, at operation 340, the method dequeues the marked data packets to the destination endpoint 30.

At operation 350, when the data packet is received at the destination endpoint 30 from the intermediate node 40, the method parses the header of the data packet to determine whether the data packet has been marked with the ECN bit tag, indicative that congestion has been detected. At operation 360, the method reads the source address associated with each marked data packet to identify the source endpoint 20 contributing to the congestion.

Once the destination endpoint 30 determines that congestion has been detected and the source endpoint 20 contributing to the congestion has been identified, at operation 370, the timer 70 is set to the preset time value and begins reverse timing from the preset time value down to zero. At operation 380, the method turns-on the feedback loop between the destination endpoint 30 to the identified source endpoint 20. As previously described, the feedback loop is turned-on during the preset time period and by the marked data packet. Although operations 360-380 are described in sequential order, a person of ordinary skill in the art will appreciate that these operations may be performed in parallel.

At operation 390, the method outputs the CN message from the destination endpoint 30 through the intermediate node 40, thereby notifying each identified source endpoint 20 of its contribution to the congestion. The method may map the CN message to a highest priority COS queue so that it may be delivered promptly.

Accordingly, at operation 400, the source endpoint 20 identified would either interrupt or pause further transmission of the data packets or reduce the transmission of the data packets to the destination endpoint. The interruption or pause or reduction in rate of transmission of the data packets from the identified source endpoint 20 would affect the transmission of the data packets to be output by the particular egress queue 52a per COS without affecting the transmission of other data packets to be dequeued by other egress queues corresponding to other COSs.

The source endpoint 20 may cease transmission into the fabric or controller 60 for a specific COS, which is accomplished by supporting COS level queuing at each source endpoint 20 contributing to the congestion, or the source endpoint 20 would reduce the transmission rate of the data packets into the intermediate node 40 for a specific destination endpoint 30 and the specific COS, which is accomplished by having destination endpoint 30 and COS queuing at each source endpoint 20 contributing to the congestion.

As illustrated in FIG. 7B, after operation 410, the method determines that the timer 70 has reached zero and stops further transmission of the CN messages to the identified source endpoint 20. As previously indicated, the preset time for the timer 70 would be set-up to give the method enough time to clear any detected congestion. If during the preset time value the method determines that the timer 70 has not reached zero, the method would continuously monitor whether the destination endpoint 30 is receiving marked data packets with the ECN bit tags by repeating operations 340 to 400.

If the timer 70 reaches zero, at operation 410, the method may stop sending the CN messages and terminate the feedback loop. Otherwise, at operation 420, if the timer 70 is counting down from the preset time value to zero and the destination endpoint 30 receives another marked data packet from the source endpoint 20 indicative of congestion, the method resets the timer back to the preset time value and resumes count down. At operation 430, if the method determines that the destination endpoint 30 is receiving sufficient data packets with no markings, although the timer 70 has not reached zero, the method will stop sending the CN messages, terminate the feedback loop, and set the timer 70 to zero. A sufficient number of data packets is a user configurable amount and influences the Decision State stored at the destination endpoint.

Accordingly, an ICF apparatus and method are provided to functionally obtain a steady stream of ACK information found in the TCP ECN mechanisms, while not requiring bandwidth degradation during normal operation. When the ICF apparatus and method are not in congestion, no ACK packets are required and consequently bandwidth resources are more plentiful and available.

The ICF apparatus and method turn-on or wake-up a feedback loop between the destination and source endpoints when congestion is detected between the endpoints. The ICF apparatus and method notify at least one source endpoint of its contribution to the congestion occurring at an associated egress queue per COS by sending a congestion notification (CN) message to at least one source endpoint. The ICF apparatus and method provide a timer per source endpoint per COS at a destination endpoint to define a time window that the feedback loop will be turned-on and to define the time window that the network would need to resolve the congestion. Thus, the ICF apparatus and method are able to provide a network with enough time to resolve any congestion. Congestion should be resolved when the timer reaches zero. Because the feedback loop is turned-on when congestion is detected, the ICF apparatus and method limit consumption of bandwidth use of the data packets in the switch network. The ICF apparatus and method enable responsive behavior during times of congestion and encourages fast convergence to a fair steady state during congestion periods. According to an aspect of the present invention, the ICF apparatus and method enable congestion detection without requiring that control traffic be sent from the destination endpoint to the source endpoint during times of no congestion.

In addition, while the terms packet and datagram have been used in the description of the present invention, the invention has import to many types of network data. For purposes of this invention, the term packet includes packet, cell, frame, datagram, bridge protocol data unit packet, packet data and any equivalents thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An intelligent congestion feedback apparatus, comprising:
   a source endpoint configured to transmit data packets;
   a destination endpoint configured to receive the data packets;
   a timer in the destination endpoint configured to initially be set to zero; and
   an intermediate node configured to detect congestion between the source endpoint and the destination endpoint, wherein
   upon congestion detection, the intermediate node marks the data packets transmitted to the destination endpoint indicative of congestion, and
   upon receipt of the marked data packets:
      the timer begins reverse counting from a preset time value to zero; and a feedback loop is turned-on between the destination endpoint and the source endpoint to transmit congestion notification (CN) messages to the source endpoint contributing to the congestion.

2. The intelligent congestion feedback apparatus as recited in claim 1, wherein headers of the data packets are marked with a congestion notification bit tag.

3. The intelligent congestion feedback apparatus as recited in claim 1, wherein when the timer reaches zero, the destination endpoint stops sending the CN messages and terminates the feedback loop.

4. The intelligent congestion feedback apparatus as recited in claim 1, wherein when the timer is counting down from the preset time value to zero and the destination endpoint receives another marked data packet from the source endpoint indicative of congestion, the timer is reset back to the preset time value and resumes count down.

5. The intelligent congestion feedback apparatus as recited in claim 1, wherein when the destination endpoint receives a user configurable number of unmarked data packets and the timer has not reached zero, the destination endpoint terminates the feedback loop and the timer is set to zero.

6. The intelligent congestion feedback apparatus as recited in claim 1, wherein, for each CN message, the destination node sets an explicit congestion notification-echo flag in an acknowledgment (ACK) packet associated with each marked data packet.

7. The intelligent congestion feedback apparatus as recited in claim 1, wherein each CN message comprises an SrcEndpointAddress field, a DestEndpointAddress field, and a CongestionState field.

8. The intelligent congestion feedback apparatus as recited in claim 1, wherein the timer is provided for each source endpoint per class of service.

9. The intelligent congestion feedback apparatus as recited in claim 1, wherein the preset time value of the timer is set depending upon a responsiveness of the source endpoint in correcting the congestion at the intermediate node, a number of source endpoints contributing to the congestion, or a degree of congestion.

10. The intelligent congestion feedback apparatus as recited in claim 1, wherein the preset time value defines a period of time that the destination endpoint is to maintain the feedback loop turned-on for transmitting the CN messages back to the source endpoint.

11. The intelligent congestion feedback apparatus as recited in claim 1, wherein, upon receipt of the CN message, the source endpoint contributing to the congestion interrupts or reduces a rate of transmission of the data packets to the intermediate node on a per class of service basis without affecting the transmission of the data packets corresponding to other classes of service.

12. An intelligent congestion feedback method, comprising:
transmitting data packets from a source endpoint;
receiving the data packets at a destination endpoint;
detecting congestion between the source endpoint and the destination endpoint;
marking the data packets transmitted to the destination endpoint indicative of congestion; and
in response to receiving the marked data packets:
reverse counting from a preset time value to zero; and
turning on a feedback loop between the destination endpoint to the source endpoint to transmit congestion notification (CN) messages to the source endpoint contributing to the congestion.

13. The intelligent congestion feedback method as recited in claim 12, further comprising:
marking the data packets with a congestion notification bit tag.

14. The intelligent congestion feedback method as recited in claim 12, further comprising:
stopping sending the CN messages and terminating the feedback loop when the reverse counting reaches zero.

15. The intelligent congestion feedback method as recited in claim 12, further comprising:
using a timer to perform the reverse counting from the preset time value to zero;
resetting the timer back to the preset time value and resuming the reverse counting when the destination endpoint receives another marked data packet from the source endpoint.

16. The intelligent congestion feedback method as recited in claim 12, further comprising:
using a timer to perform the reverse counting from the preset time value to zero;
terminating the feedback loop and setting the timer to zero when the destination endpoint receives a user configurable number of unmarked data packets and the timer has not reached zero.

17. The intelligent congestion feedback method as recited in claim 12, further comprising:
providing a timer to perform the reverse counting from the preset time value to zero for each source endpoint per class of service.

18. The intelligent congestion feedback method as recited in claim 12, further comprising:
adjusting the preset time value depending upon a responsiveness of the source endpoint in correcting the congestion at the intermediate node, a number of source endpoints contributing to the congestion, or a degree of congestion.

19. The intelligent congestion feedback method as recited in claim 12, further comprising:
setting, for each CN message, an explicit congestion notification flag in a packet associated with each marked data packet.

20. The intelligent congestion feedback method as recited in claim 12, further comprising:
setting, for each CN .message, an SrcEndpointAddress field, a DestEndpointAddress field, and a CongestionState field.

21. The intelligent congestion feedback method as recited in claim 12, further comprising:
defining the preset time value to zero as a period of time to maintain the feedback loop turned-on for transmitting the CN messages back to the source endpoint.

22. The intelligent congestion feedback method as recited in claim 12, further comprising:
mapping the CN message to a highest priority class of service queue when transmitting the CN message to the source endpoint.

23. The intelligent congestion feedback method as recited in claim 12, wherein, upon receipt of the CN message, the method further comprises:
interrupting or reducing a rate of transmission of the data packets from the source contributing to the congestion to the intermediate node on a per class of service basis without affecting the transmission of the data packets corresponding to other classes of service.

24. An intelligent congestion feedback apparatus, comprising:
source endpoint means for transmitting data packets;

destination endpoint means for receiving the data packets;
timing means in the destination endpoint means initially set to zero; and
intermediate means for detecting congestion between the source endpoint and the destination endpoint, wherein upon congestion detection, the intermediate means marks the data packets transmitted to the destination endpoint indicative of congestion, and upon receipt of the marked data packets, the timing means begins reverse counting from a preset time value to zero and a feedback loop is turned-on between the destination endpoint means and the source endpoint means for transmitting congestion notification (CN) messages to the source endpoint contributing to the congestion.

* * * * *

UNITED STATES PATENT AND TRADEMARK OFFICE
CERTIFICATE OF CORRECTION

| | | |
|---|---|---|
| PATENT NO. | : 7,859,996 B2 | |
| APPLICATION NO. | : 11/259095 | |
| DATED | : December 28, 2010 | |
| INVENTOR(S) | : Bruce H. Kwan et al. | |

It is certified that error appears in the above-identified patent and that said Letters Patent is hereby corrected as shown below:

In the Specifications:

In column 1, line 8, delete "60/279,242," and insert -- 60/679,242, --, therefor.

In column 1, line 9-10, delete "application" and insert -- applications --, therefor.

In the Claims:

In column 10, line 44, in claim 20, delete ".message," and insert -- message, --, therefor.

Signed and Sealed this
First Day of March, 2011

David J. Kappos
*Director of the United States Patent and Trademark Office*